Patented Oct. 24, 1933

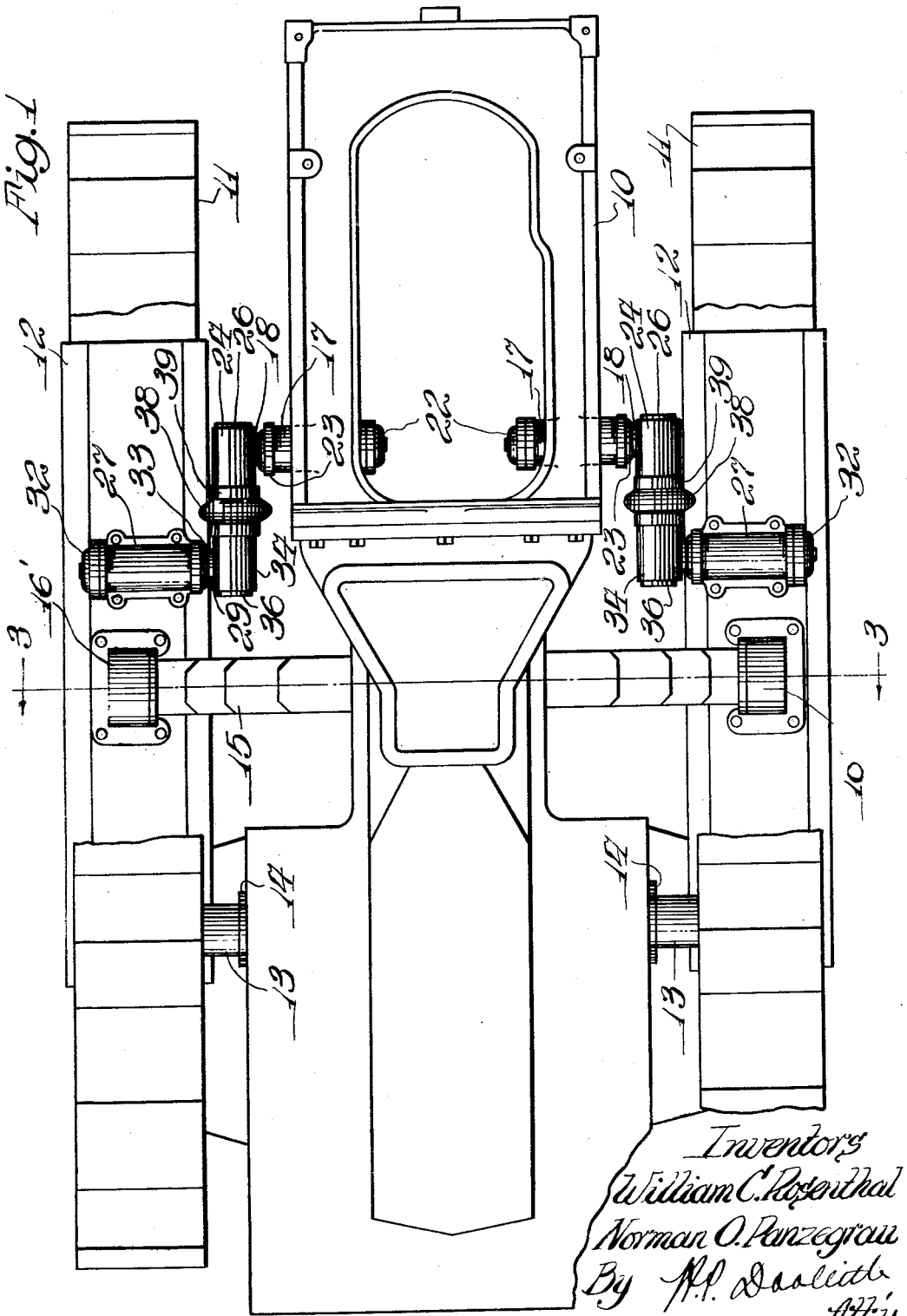

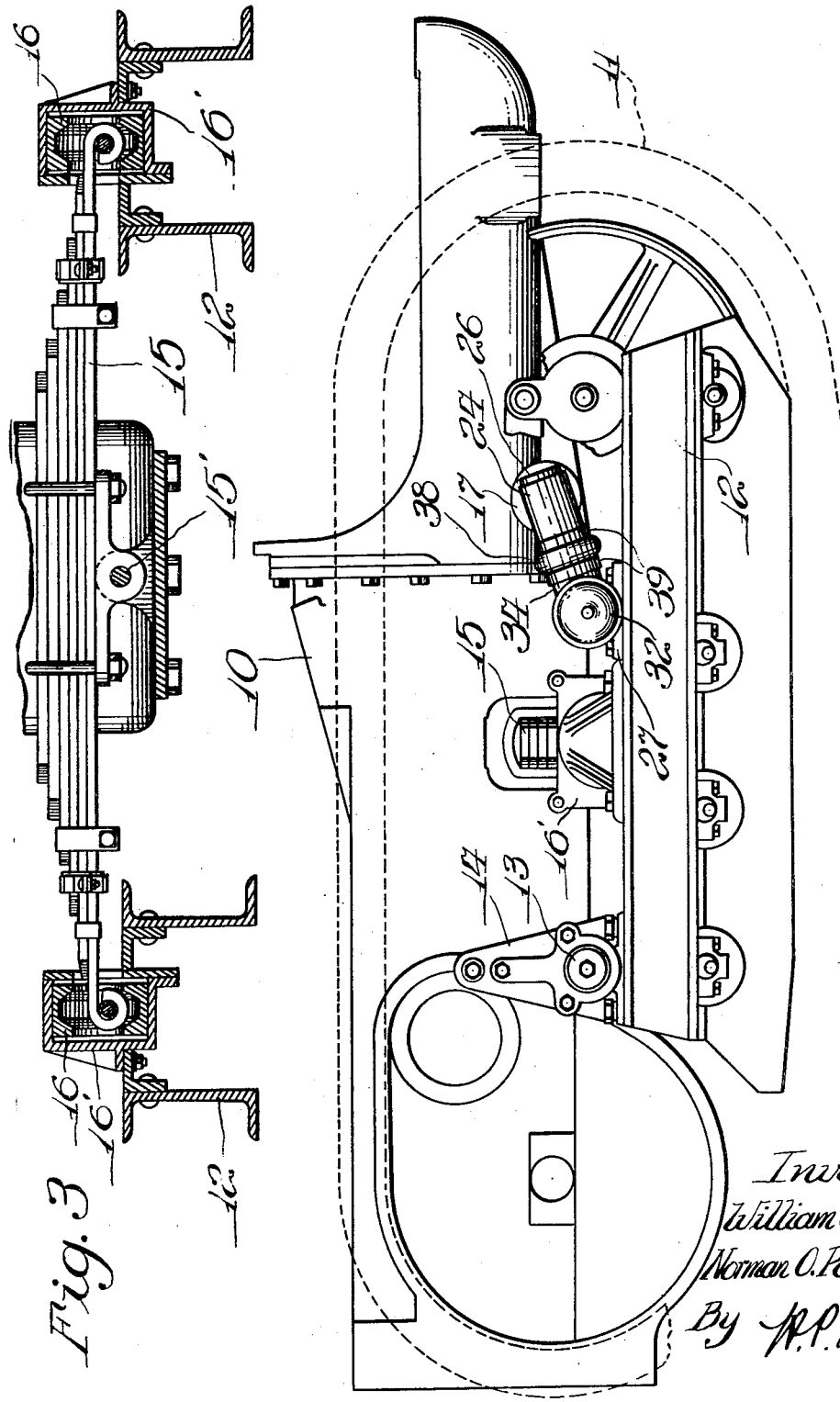

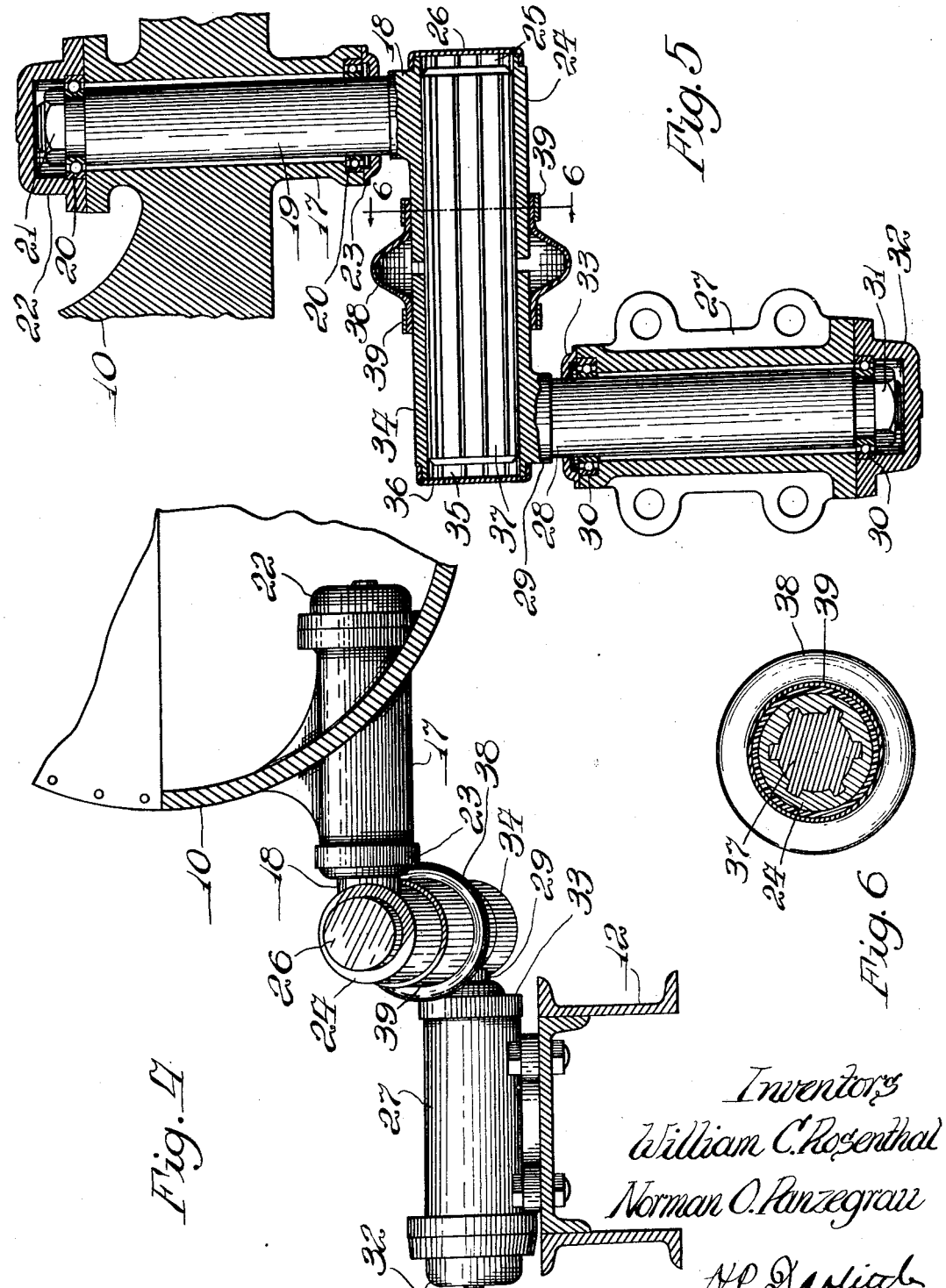

1,932,121

UNITED STATES PATENT OFFICE 1,932,121

TRACK FRAME STABILIZER FOR TRACK-LAYING TRACTORS

William C. Rosenthal and Norman O. Panzegrau, Chicago, Ill., assignors to International Harvester Company, a corporation of New Jersey Application May 6, 1932. Serial No. 609,649

13 Claims. (Cl. 305—9)

This invention relates to track frame stabilizers for track-laying tractors.

The principal object of the invention is to provide a track-laying tractor with means for maintaining the track frames against lateral movement with respect to each other and with respect to the main frame of the tractor. This object is accomplished by providing stabilizing means connected to the forward ends of the track frames and to the main frame of the tractor, said means being yieldable to provide up-and-down movement of the track frames and being rigid against movement of the track frames in a lateral direction with respect to the main frame of the tractor.

In the drawings:

Figure 1 is a general plan view of a tractor chassis embodying the invention, with certain parts broken away and other parts removed to more clearly illustrate the invention;

Figure 2 is a side elevation of the same structure shown in Figure 1;

Figure 3 is a cross section taken on the line 3—3 of Figure 1;

Figure 4 is an enlarged detail of the stabilizing connection between one of the track frames and the main frame of the tractor;

Figure 5 is a sectional view of the same elements shown in Figure 4; and

Figure 6 is a section taken on the line 6—6 of Figure 4.

Referring to the drawings, the main frame 10 of the tractor is of a conventional construction, being cast integrally as a unitary structure. Driving means for the tracks 11 are provided at the rear of the tractor, said means being of a conventional construction, such as shown in U. S. Patent No. 1,503,615. The track frames 12 positioned at the sides of the main frame, are pivoted thereto on a transverse axis. This construction has not been shown in detail as it is well known in the art. The attaching axle is designated by the numeral 13, on which brackets 14 mounted on the track frames are pivoted.

The front of the main frame is supported on the track frames by a transverse spring 15 which extends beneath the main frame 10, being pivotally secured thereto on a longitudinal axis by the pin 15' and secured at its ends to the track frames by means including piston-like members 16 pivoted to the ends of the spring on longitudinal axes and housings 16' in which said members are mounted for limited transverse movement. Said means are particularly constructed to permit oscillation of the track frames about their axis of attachment on the main frame and to permit a limited lateral movement of the ends of the spring, which movement is necessary when the track frames move up and down.

On the main frame 10 and integral with the casting forming the front of said frame, a bearing member 17 is formed at each side. Said members are provided with bores extending therethrough on a transverse axis, the bores of the two members being in axial alignment. The members are of a sufficient length in the transverse direction to afford a bearing surface sufficient to withstand the torque transmitted thereto by lateral pressure exerted on the track frames. Connecting members 18 are provided with a shaft 19 which extends through the bore formed in the member 17. As the construction at each side of the tractor is exactly the same, only one of the stabilizing connections will be referred to in this description. The shaft 19 is rotatably mounted in the bearing member 17 by ballbearing assemblies 20 at each end of the member. A nut 21 holds the shaft and the bearing assemblies in position on the shaft 19. A cap 22, fitted over the inner end of the shaft 19, is secured to the bearing member 17, forming an oil-tight connection. An annular member 23, surrounding the shaft 19, is secured at the other end of the bearing member 17 to protect the bearing at that end against the entrance of dirt. At its outer end the member 18 has a right angle extension 24 in which a splined bore 25 is formed. A dust cap 26 is fitted over one end of the bore 25.

A housing 27 is rigidly mounted on the track frame in a position somewhat rearwardly from the position of the bearing member 17 on the main frame. Said housing is provided with a transverse bore of a substantial length, through which a shaft 28 formed as part of a member 29, extends. Ball bearing assemblies 30 at the ends of the housing rotatably support said shaft. A nut 31 secures the shaft and the bearing assemblies in position. A cap 32 closes the outer end of the housing and protects the bearings from the entrance of dirt. An annular flange member 33 likewise seals the inner end of the housing around the shaft 28.

The member 29 is identical in construction with the member 18. A right angle extension 34 is provided with a splined bore 35. A dust cap 36 closes one end of said bore. The members 18 and 29 and their supporting means are so positioned on the main frame and the track frame of the tractor that the axes of the bores 25 and 35 lie in the same vertical plane. It will be, therefore, understood that the axes of said bores may be brought into axial alignment by the proper rotation of said members. A splined shaft 37 is mounted in the extensions 24 and 34, slidably extending through the bores 25 and 35. The caps 26 and 36 limit the endwise movement of said shaft and bolt it in position. The extensions 24 and 34 are of such a length that their adjacent ends will not abut during any normal movement of the tractor and track frame and are also of the proper length to provide a sufficient support for the shaft 37 in any relative position which may be brought about between the members 18 and 29.

A flexible shield 38 is mounted around the adjacent ends of the members 24 and 34. Said shield is secured to the ends of said members by bands 39. The shield has sufficient flexibility for axial movement of the bands 39 to permit the maximum separation between the ends of the members 24 and 34. It will be understood that this shield construction and the caps 26 and 36 provide an oil-tight reservoir which may be supplied with lubricant.

In the operation of a tractor on which the stabilizing connections above described are mounted, the track frames oscillate about their axes of connections in the usual manner. In normal operation there are lateral forces exerted against the track frames which tend to move them laterally relative to the tractor and to, therefore, put severe strains upon the pivotal connections of the frames with the main frame. As also it is necessary to provide lateral movement in the front transverse support due to shortening the effective transverse dimension of said support during angular movement thereof, lateral bracing means cannot easily be incorporated in the connections of the transverse support with the track frames. For this reason it has been found desirable to provide separate stabilizing connections, such as shown and described. It will be understood from the detailed description that the stabilizing connections will permit pivoting action of the track frames in an up-and-down direction between two vertical planes. However, the connections between the members 18 and 29 permit only a movement of translation of said members with respect to each other. Said members may then, therefore, be considered stationary with respect to rotative movement about a transverse axis. This construction, therefore, holds the track frames to movement between vertical planes and prevents any lateral displacement of said frames with respect to the main frame of the tractor.

It is to be understood that applicants have shown only a preferred form of their stabilizing connections for the track frames of a track-laying tractor and that they claim as their invention all modifications falling within the scope of the appended claims.

What is claimed is:

1. In a track-laying tractor having a main frame and track frames pivotally attached thereto on a transverse axis, a track frame stabilizing means comprising members pivoted to the main frame on a transverse axis, members pivoted to the track frames on a transverse axis, and means for connecting the members at each side of the tractor together for a movement of translation with respect to each other at right angles to the pivot axes of said members.

2. In a track-laying tractor having a main frame and track frames pivotally attached thereto on a transverse axis, a track frame stabilizing means comprising members pivoted to the main frame on a transverse axis, members pivoted to the track frames on a transverse axis, and means for connecting the members at each side of the tractor together for a movement of translation with respect to each other at right angles to the pivot axes of said members, said means holding said members against angular movement with respect to each other.

3. In a track-laying tractor having a main frame and a track frame pivotally attached thereto on a transverse axis, a stabilizer comprising a member pivoted to the main frame on a transverse axis, a member pivoted to the track frame on a transverse axis, one of said members being provided with a bore at right angles to the pivot axis, and a third member connected to the other member and extending through said bore for reciprocation with respect thereto at right angles to the pivot axes of the members.

4. In a track-laying tractor having a main frame and a track frame pivotally attached thereto on a transverse axis, a stabilizer comprising a member pivoted to the main frame on a transverse axis, a member pivoted to the track frame on a transverse axis, one of said members being provided with a bore at right angles to the pivot axis, and a third member connected to the other member and slidably and non-rotatably extending through said bore for reciprocation with respect thereto at right angles to the pivot axes of the members.

5. In a track-laying tractor having a main frame and a track frame pivotally attached thereto on a transverse axis, a stabilizer comprising a member pivoted to the main frame on a transverse axis, a member pivoted to the track frame on a transverse axis, said members being provided with aligned bores, and a third member extending through said bores for reciprocation with respect thereto at right angles to the pivot axes of the members.

6. In a track-laying tractor having a main frame and a track frame pivotally secured thereto on a transverse axis, a stabilizer comprising a member pivotally secured to the main frame on a transverse axis and extending outwardly therefrom, and a member secured to the track frame on a transverse axis and extending inwardly therefrom, one of said members being provided with an extension which slidably engages a mating portion of the other member.

7. In a track-laying tractor having a main frame and a track frame pivotally secured thereto on a transverse axis, a stabilizer comprising a member pivotally secured to the main frame on a transverse axis and extending outwardly therefrom, the outer end being provided with a bore at right angles to the pivot axis, a member secured to the track frame on a transverse axis and extending inwardly therefrom, said member being provided with a bore through its inner end, the axes of said bores lying in the same vertical plane whereby they may be brought into axial alignment, and a third member slidably extending into the bores whereby the members may move axially of the bores with respect to each other.

8. In a track-laying tractor having a main frame and a track frame pivotally secured thereto on a transverse axis, a stabilizer comprising a member pivotally secured to the main frame on a transverse axis and extending outwardly therefrom, the outer end being provided with a splined bore at right angles to the pivot axis, a member secured to the track frame on a transverse axis and extending inwardly therefrom, said member being provided with a splined bore through its inner end, the axes of said bores lying in the same vertical plane whereby they may be brought into axial alignment, and a third member slidably extending into the bores and provided with a splined surface whereby the members may move axially of the bores with respect to each other.

9. In a track-laying tractor having a main frame, track frames pivotally connected to the rear of the main frame on a transverse axis and a transverse front support pivotally connected to the main frame and to the track frames, a track stabilizer at each side of the tractor comprising a member having a portion pivoted to the track frame on a transverse axis and a portion extending at right angles therefrom, a second member having a portion pivoted to the main frame on a transverse axis and a portion extending at right angles therefrom, said right angle portions of the two members being positioned in alignment, and means slidably securing one of said portions with respect to the other whereby the track frame is held against lateral movement with respect to the main frame.

10. In a track-laying tractor having a main frame, track frames pivotally connected to the rear of the main frame on a transverse axis and a transverse front support pivotally connected to the main frame and to the track frames, a stabilizing device connecting each track frame to the main frame comprising a member having a portion pivoted to said track frame on a transverse axis and a portion extending at right angles to said axis, a second member pivoted to the main frame on a transverse axis and having a portion extending at right angles to said axis and positioned in alignment with the right angle portion of the first named member, and a third member slidably mounted on the right angle extensions whereby the track frame is held against lateral movement with respect to the main frame.

11. A device as set forth in claim 10, in which the right angle portions of the members are internally grooved, the third member being splined to slidably engage said grooved portions.

12. A device as set forth in claim 10, in which the right angular portions of the members terminate with spaced relation to each other, a flexible shield surrounding said members being provided to seal the adjacent ends.

13. In a track laying tractor having a main frame and track frames pivotally attached thereto on a transverse axis, track frame stabilizing means comprising a member pivotally connected to the main frame at each side thereof on a transverse axis, a member pivotally connected to each track frame on a transverse axis, and means for connecting the members pivoted on the track frames to the members pivoted on the main frame for a movement of translation with respect to each other at right angles to the pivot axes of said members.

WILLIAM C. ROSENTHAL.
NORMAN O. PANZEGRAU.